United States Patent
Lv et al.

(10) Patent No.: US 11,171,412 B2
(45) Date of Patent: Nov. 9, 2021

(54) ANTENNAS AND UNMANNED AERIAL VEHICLE

(71) Applicant: SZ DJI TECHNOLOGY CO., LTD., Shenzhen (CN)

(72) Inventors: Chao Lv, Shenzhen (CN); Dian Wang, Shenzhen (CN); Han Huang, Shenzhen (CN); Meng Hu, Shenzhen (CN); Jianping Wei, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 85 days.

(21) Appl. No.: 16/365,653

(22) Filed: Mar. 26, 2019

(65) Prior Publication Data

US 2019/0221923 A1 Jul. 18, 2019

Related U.S. Application Data

(63) Continuation of application No. PCT/CN2016/100148, filed on Sep. 26, 2016.

(51) Int. Cl.
*H01Q 1/28* (2006.01)
*H01Q 17/00* (2006.01)
(Continued)

(52) U.S. Cl.
CPC .............. *H01Q 1/28* (2013.01); *B64C 1/36* (2013.01); *B64C 39/024* (2013.01); *H01Q 1/528* (2013.01);
(Continued)

(58) Field of Classification Search
CPC .......... H01Q 1/28; H01Q 1/528; H01Q 5/378; H01Q 5/30; H01Q 17/001; H01Q 1/285;
(Continued)

(56) References Cited

U.S. PATENT DOCUMENTS 9,116,239 B1 * 8/2015 Billsberry .............. H01Q 21/28
2003/0231138 A1 12/2003 Weinstein
(Continued)

FOREIGN PATENT DOCUMENTS

CN 1802772 A 7/2006
CN 102017297 A 4/2011
(Continued)

OTHER PUBLICATIONS

The World Intellectual Property Organization(WIPO) International Search Report and Written Opinion for PCT/CN2016/100148 dated Jul. 10, 2017 6 pages.

*Primary Examiner* — Andrea Lindgren Baltzell
*Assistant Examiner* — Michael M Bouizza
(74) *Attorney, Agent, or Firm* — Anova Law Group, PLLC

(57) ABSTRACT

An unmanned aerial vehicle (UAV) includes a fuselage, a power system arranged at the fuselage, and an antenna assembly arranged at the fuselage. The antenna assembly includes an antenna operating in a first frequency band and a second frequency band different from each other, a first parasitic unit configured to change a radiation direction of the antenna in the first frequency band, and a second parasitic unit configured to change a radiation direction of the antenna in the second frequency band.

20 Claims, 12 Drawing Sheets

(51) Int. Cl.
 *H01Q 5/30* (2015.01)
 *B64C 1/36* (2006.01)
 *B64C 39/02* (2006.01)
 *H01Q 1/52* (2006.01)
 *H01Q 5/378* (2015.01)

(52) U.S. Cl.
 CPC ............... *H01Q 5/30* (2015.01); *H01Q 5/378* (2015.01); *H01Q 17/001* (2013.01)

(58) Field of Classification Search
 CPC .......... H01Q 1/52; H01Q 3/01; B64C 39/024; B64C 1/36; B64C 2201/146
 See application file for complete search history.

(56) References Cited

U.S. PATENT DOCUMENTS

2009/0224991 A1* 9/2009 Rowson ............... H01Q 9/0421
 343/747
2017/0358864 A1* 12/2017 Arias ........................ H01Q 1/28

FOREIGN PATENT DOCUMENTS

| CN | 102044756 A | 5/2011 |
| CN | 103794853 A | 5/2014 |
| CN | 104124517 A | 10/2014 |
| CN | 104201473 A | 12/2014 |
| CN | 204741080 U | 11/2015 |
| CN | 105214288 A | 1/2016 |
| CN | 205376749 U | 7/2016 |

\* cited by examiner

ANTENNAS AND UNMANNED AERIAL VEHICLE

CROSS-REFERENCE TO RELATED APPLICATION

This application is a continuation application of International Application No. PCT/CN2016/100148, filed on Sep. 26, 2016, the entire contents of which are incorporated herein by reference.

TECHNICAL FIELD

The present disclosure relates to the field of unmanned aerial vehicle and, more particularly, to an antenna and an unmanned aerial vehicle.

BACKGROUND

Antennas are components for wireless communication between devices. In compact structures in conventional technologies, there are more and more restrictions on antenna. An unmanned aerial vehicle (UAV) may need an antenna with a compact structure, a limited size, and multiple antenna frequency bands.

Considering the appearance and functional needs in a UAV, it is needed to use in UAV complex metal structures or structures similar to good conductors. In addition, a UAV may include a circuit board, wires, and other structures inside. However, metal structures, good conductor structures, circuit boards, and wires all disturb the antenna's radiation direction, causing the antenna's radiation direction pattern to become diffused, further reducing UAV performance of sending and receiving signals.

SUMMARY

In accordance with the disclosure, there is provided an unmanned aerial vehicle (UAV) including a fuselage, a power system arranged at the fuselage, and an antenna assembly arranged at the fuselage. The antenna assembly includes an antenna operating in a first frequency band and a second frequency band different from each other, a first parasitic unit configured to change a radiation direction of the antenna in the first frequency band, and a second parasitic unit configured to change a radiation direction of the antenna in the second frequency band.

Also in accordance with the disclosure, there is provided an antenna assembly including an antenna operating in a first frequency band and a second frequency band different from each other, a first parasitic unit configured to change a radiation direction of the antenna in the first frequency band, and a second parasitic unit configured to change a radiation direction of the antenna in the second frequency band.

Figure 1A:
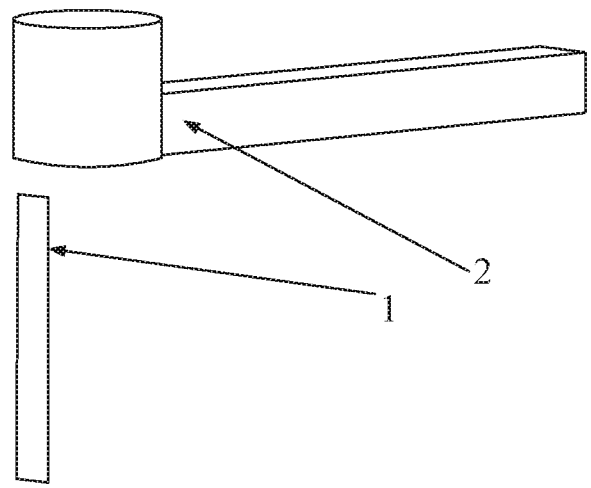
FIG. 1A is a schematic view of an antenna and a metal structure.

Reference numerals used in the drawings include: 1, antenna; 2, metal structure; 10, antenna assembly; 11, antenna; 3, first parasitic unit; 4, second parasitic unit; 100, unmanned aerial vehicle; 102, supporting device; 104, photographing device; 106, propeller; 107, motor; 108, sensing system; 110, communication system; 112, ground station; 117, electronic speed controller; 118, flight controller; 21, solid line; 22, dashed line; and 23, dotted line.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

Further, in the present disclosure, the disclosed embodiments and the features of the disclosed embodiments may be combined when there are no conflicts.

Figure 1B:
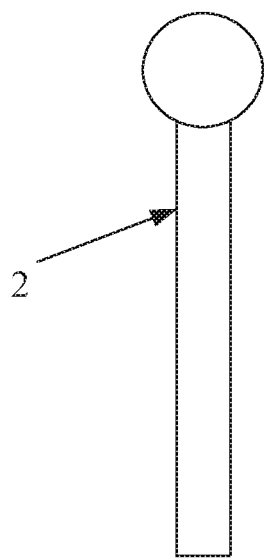
FIG. 1B is a top view of the antenna and the metal structure shown in FIG. 1A.

A device such as an unmanned aerial vehicle (UAV), a robot, a ground station, a radio station, a base station, and/or like may need to be equipped with an antenna for transmitting and receiving signals. In addition, considering the appearance and function needs, a device such as a UAV, a robot, a ground station, a radio station, a base station, and/or like usually includes complex metal structures or structures similar to a good conductor. A metal structure or a structure similar to a good conductor may disturb a radiation direction of the antenna. As shown in FIG. 1A, structure 1 indicates an antenna, and the antenna 1 can operate in a plurality of frequency bands. The antenna 1 may operate in two frequency bands, one low frequency band and one high frequency band. Structure 2 indicates a metal structure. Taking a UAV as an example, the metal structure 2 may include a metal structure of a fuselage of the UAV, e.g., a metal structure of a wing portion, a metal structure of a stand portion, or a metal structure of another portion of the fuselage. FIG. 1B is a top view of the antenna 1 and the metal structure 2. As shown in FIG. 1A, the metal structure 2 is arranged above the antenna 1. For example, the metal structure 2 may be arranged at an upper right position with respect to the antenna 1, and the metal structure 2 is perpendicular to the antenna 1. In the top view of FIG. 1B the metal structure 2 shields the antenna 1. The positional relationship shown in FIGS. 1A and 1B is only one of various possible positional relationships between the antenna and the metal structure. In various application scenarios, the relative angle between the antenna and the metal structure is not limited to a right angle, and the distance between the antenna and the metal structure is not limited to a fixed value. The length of the antenna and the shape of the metal structure are not limited to those shown in FIGS. 1A and 1B.

Figure 1C:
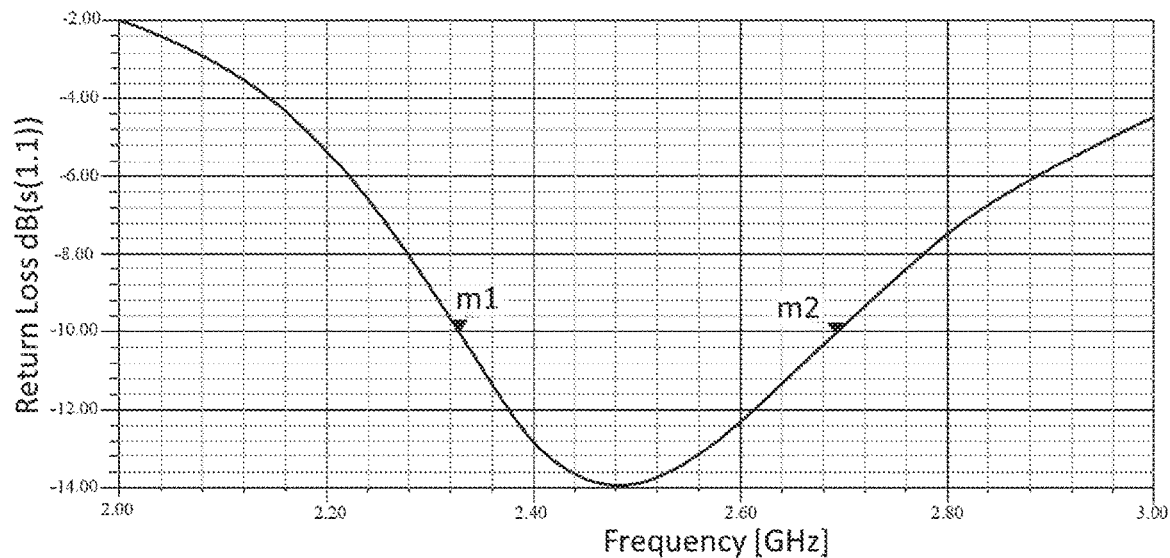
FIG. 1C illustrates matching characteristics of the antenna shown in FIG. 1A in a low frequency band.
Figure 1D:
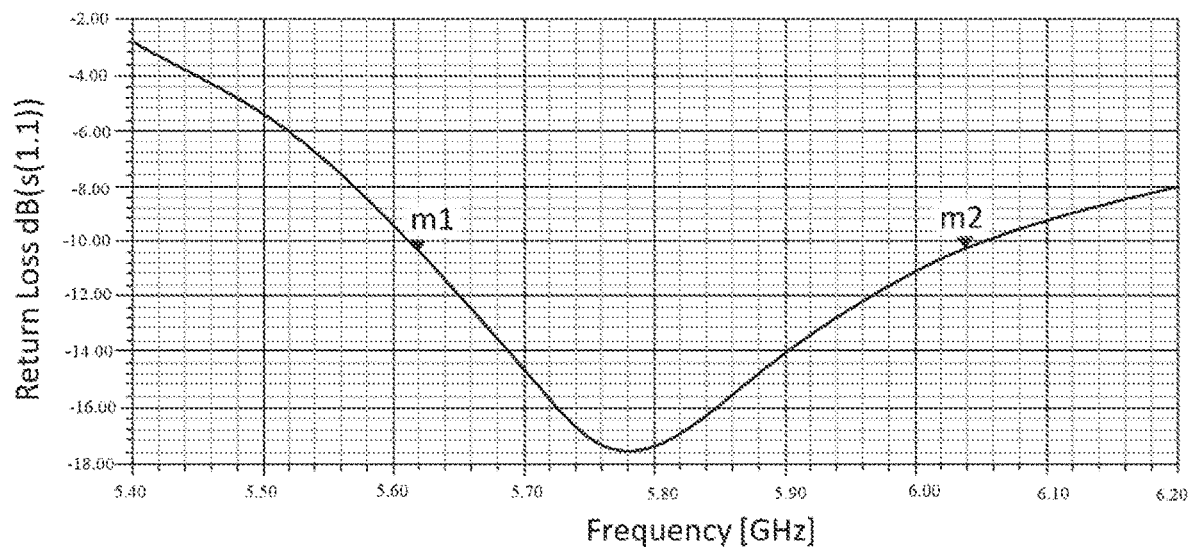
FIG. 1D illustrates matching characteristics of the antenna shown in FIG. 1A in a high frequency band.

When the positional relationship between the antenna and the metal structure is a positional relationship as shown in FIGS. 1A and 1B, the antenna can have relatively good port matching in both the low frequency band and the high frequency band. FIG. 1C shows matching characteristics of the antenna at the low frequency band. FIG. 1D shows matching characteristics of the antenna at the high frequency band. The horizontal axes of FIGS. 1C and 1D indicate frequencies. The vertical axes of FIGS. 1C and 1D indicate return losses. According to FIGS. 1C and 1D, a frequency at a valley is a resonant frequency and the return loss is minimized at the valley, and correspondingly the antenna has an optimized matching performance at the valley. As shown in FIG. 1C, in the low frequency band, the antenna has an optimized matching performance in a frequency range from, e.g., approximately 2.5 GHz to approximately 2.55 GHz. Further, as shown in FIG. 1D, in the high frequency band, the antenna has an optimized matching performance in a frequency range from, e.g., approximately 5.76 GHz to approximately 5.80 GHz.

Figure 1E:
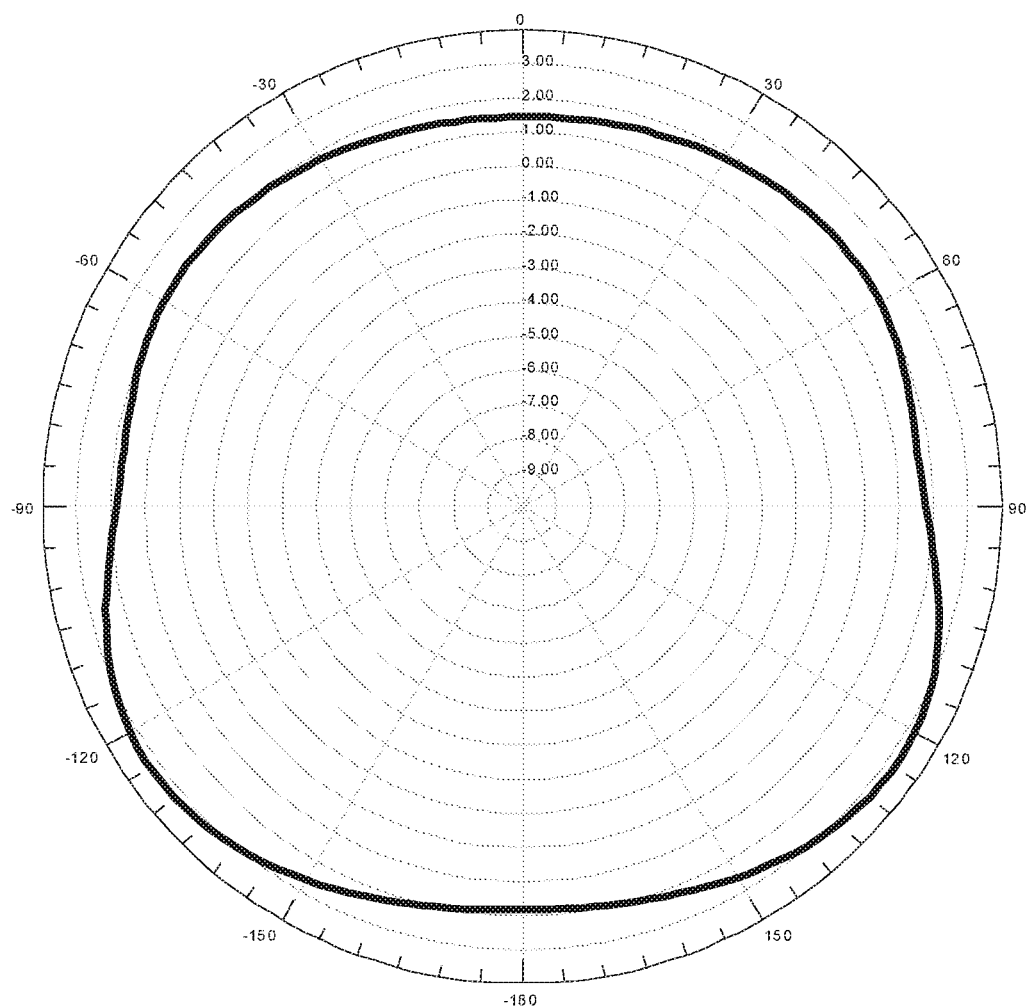
FIG. 1E shows a radiation direction pattern of the antenna shown in FIG. 1A with the radiation direction in the low frequency band being disturbed.
Figure 1F:
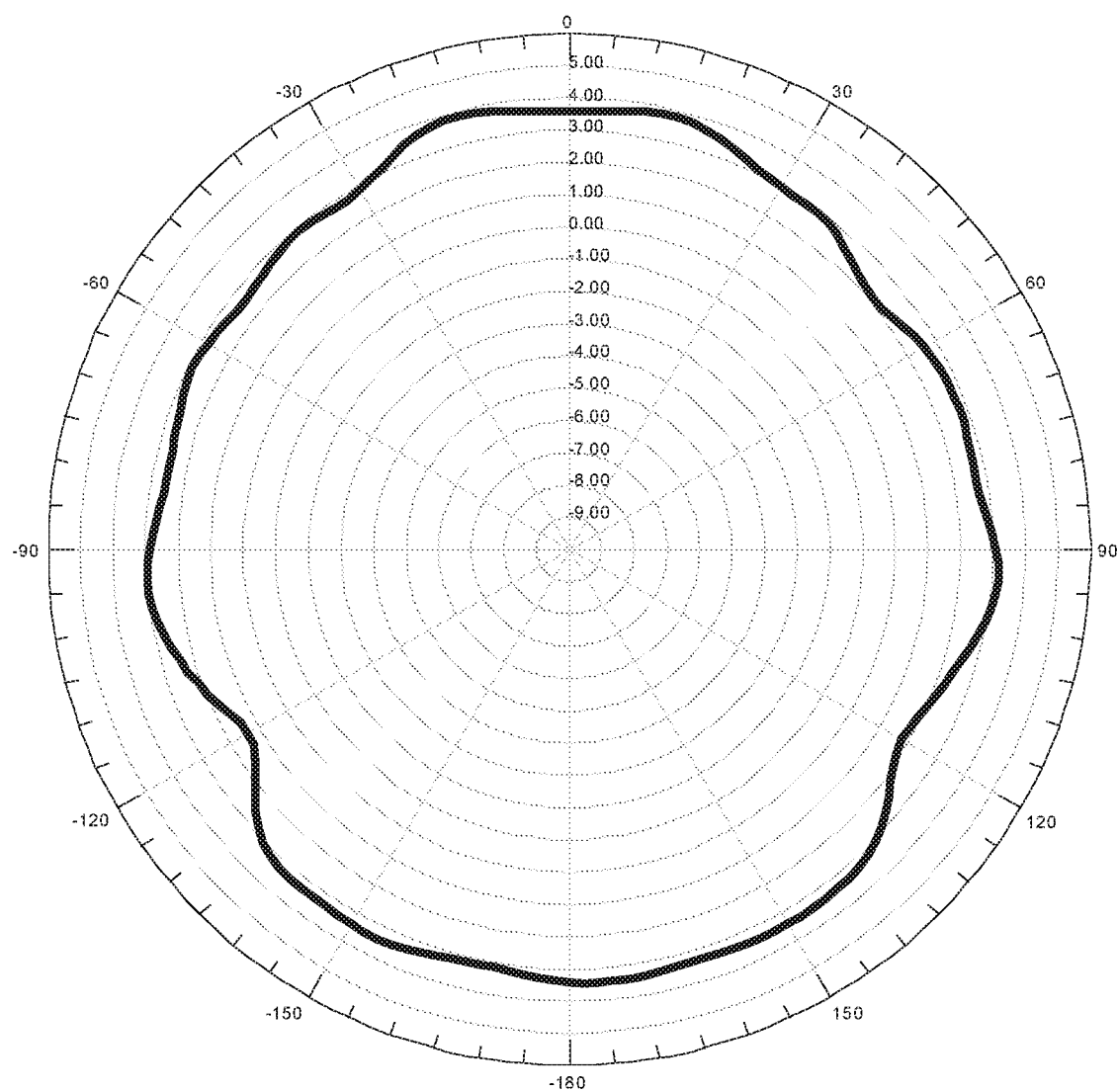
FIG. 1F shows a radiation direction pattern of the antenna shown in FIG. 1A in the high frequency band.

However, the metal structure may disturb the antenna. For example, the metal structure may disturb a radiation direction of the antenna in different frequency bands. FIG. 1E shows a radiation direction pattern of the antenna 1 with radiation direction in the low frequency band being disturbed, and FIG. 1F shows a radiation direction pattern of the antenna in the high frequency band. According to a comparison between FIGS. 1E and 1F, the radiation direction of the antenna 1 in the low frequency band is deviated to a side of approximately 180 degrees, equivalent to approximately −180 degrees. Since the distance between the antenna 1 and the metal structure 2 is approximately half a wavelength, the antenna 1 is relatively less disturbed by the metal structure 2 in the high frequency band.

Figure 1G:
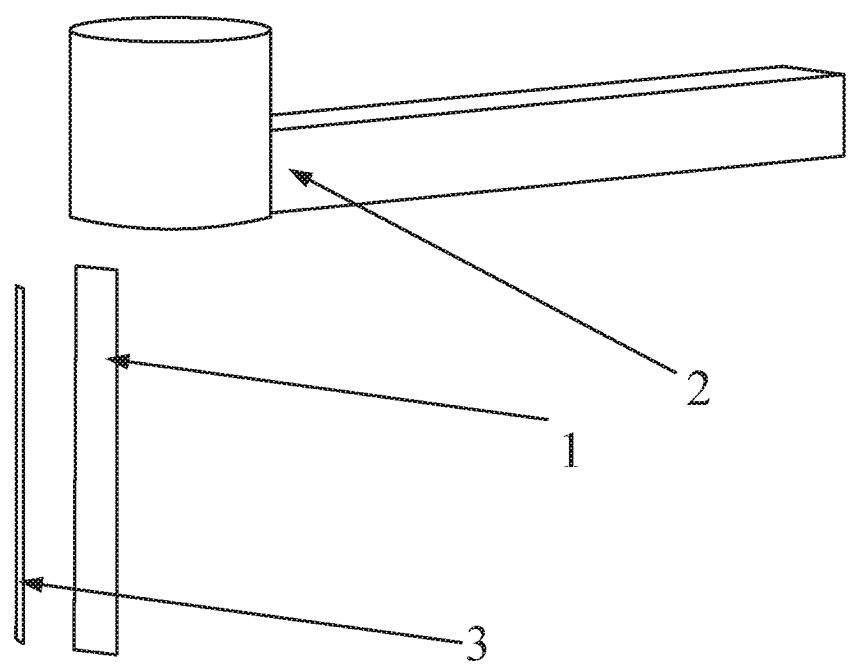
FIG. 1G is a schematic view of an antenna with a parasitic unit.
Figure 1H:
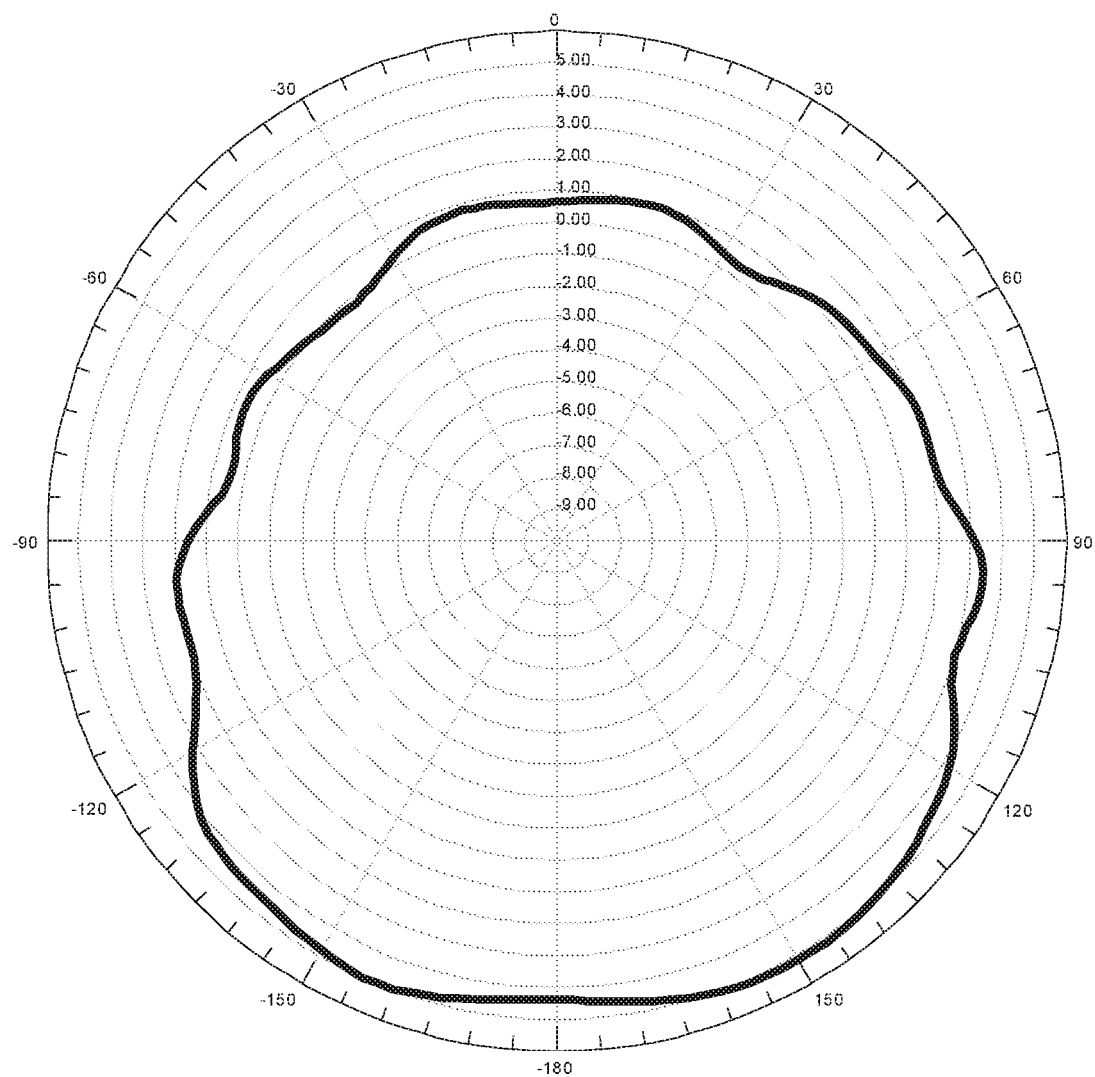
FIG. 1H illustrates a radiation direction pattern of the antenna shown in FIG. 1G in the high frequency band.

In addition, the radiation direction pattern of the antenna 1 at the high frequency band may be disturbed by a metal structure. As shown in FIG. 1G, to address the problem of the radiation direction in the low frequency band being disturbed as shown in FIG. 1E, in addition to the structure shown in FIG. 1A, a parasitic unit 3 is added in vicinity of the antenna 1. The parasitic unit 3 can eliminate the disturbance of the metal structure 2 on the radiation direction of the antenna 1 in the low frequency band. However, the parasitic unit 3 may disturb the radiation direction of the antenna 1 in the high frequency band. FIG. 1H illustrates a radiation direction pattern of the antenna 1 in the high frequency band with the parasitic unit 3 added. As shown in FIG. 1H, the radiation direction of antenna 1 in the high frequency band is deviated to a side of approximately 180 degrees, equivalent to approximately −180 degrees.

The metal structure 2 may exist on the side of approximately 180 degrees, equivalent to approximately −180 degrees, and the metal structure 2 may include the metal structure of the fuselage of the UAV. Thus, under the disturbance of the metal structure 2, the radiation direction of the antenna 1 in both the low frequency band and the high frequency band may deviated toward the metal structure of the fuselage. In practical applications, if the radiation direction of the antenna 1 is deviated toward the metal structure of the fuselage, the performance of the antenna 1 may be degraded. Thus, in practical applications, it is not desirable that the radiation direction of the antenna 1 be deviated toward an disturbance source such as a metal structure.

Figure 2A:
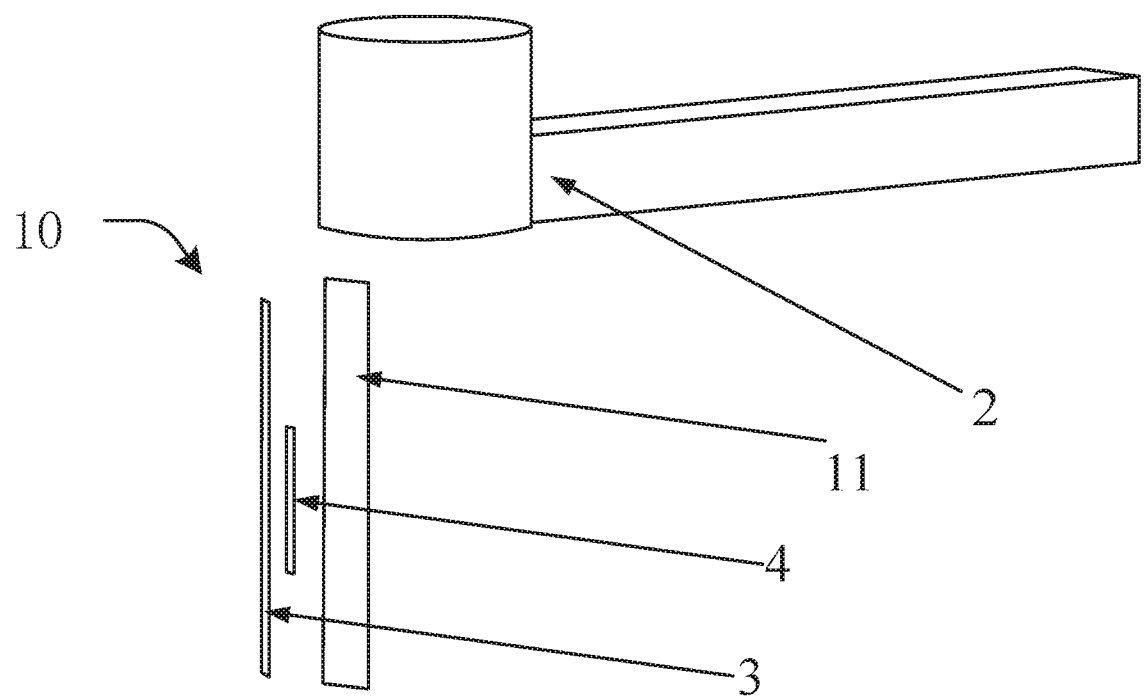
FIG. 2A is a schematic view of an exemplary antenna assembly.

The present disclosure provides an antenna assembly. The antenna assembly can be used in devices such as a UAV, a robot, a ground station, a radio station, a base station, and/or the like. FIG. 2A is a schematic view of an exemplary antenna assembly 10 consistent with various disclosed embodiments of the present disclosure. As shown in FIG. 2A, the antenna assembly 10 includes an antenna 11, and a first parasitic unit 3, and a second parasitic unit 4. In some embodiments, the antenna 11 can operate in at least two frequency bands. In some embodiments, the antenna 11 can operate in two frequency bands, including a first frequency band and a second frequency band. The first frequency band and the second frequency band are two different frequency bands. In some embodiments, the first frequency band may include a low frequency band, and the second frequency band may include a high frequency band. In some embodiments, the first frequency band may include a high frequency band, and the second frequency band may include a low frequency band. In some embodiments, the first frequency band may partially overlap the second frequency band.

In addition, as shown in FIG. 2A, the structure 2 indicates a metal structure. Taking a UAV as an example, the metal structure 2 may include a metal structure of a fuselage of the UAV, e.g., a metal structure of a wing portion, a metal structure of a stand portion, and/or a metal structure of another portion of the UAV.

In some embodiments, the first frequency band includes a low frequency band, and the second frequency band includes a high frequency band. As shown in FIG. 2A, the first parasitic unit 3 is arranged in the antenna assembly 10. The first parasitic unit 3 can be used to change a radiation direction of the antenna 11 in the first frequency band. Thus, in these embodiments, the first parasitic unit 3 may be included in the antenna assembly 10 to suppress the disturbance of the metal structure 2 on the radiation direction of the antenna 11 in the low frequency band.

In addition, as shown in FIG. 2A, the antenna assembly 10 further include the second parasitic unit 4. The second parasitic unit 4 can be used to change the radiation direction of the antenna 11 in the second frequency band. Thus, in some embodiments, the second parasitic unit 4 may be included in the antenna assembly 10 to suppress the disturbance of the metal structure 2 on the radiation direction of the antenna 11 in the high frequency band.

In some embodiments, the first parasitic unit 3 may be arranged at a position within a first preset distance from the antenna 11. A length of the first parasitic unit 3 is not restricted. The length of the first parasitic unit 3 may be a first preset length, or may be determined according to a disturbance intensity of the metal structure 2 on the radiation direction of the antenna 11 in the low frequency band, or may be determined according to a strength of adjustment of the first parasitic unit 3 on the radiation direction of the antenna 11 in the low frequency band.

In some embodiments, the second parasitic unit 4 may be arranged at a position within a second preset distance from the antenna 11. A length of the second parasitic unit 4 may be a second preset length, or may be determined according to a disturbance intensity of the metal structure 2 on the radiation direction of the antenna 11 in the high frequency band, or may be determined according to a strength of adjustment of the second parasitic unit 4 on the radiation direction of the antenna 11 in the high frequency band.

As shown in FIG. 2A, the first parasitic unit 3 and the second parasitic unit 4 may be sequentially arranged in front of the antenna 11 to suppress the disturbance of the metal structure 2 on the antenna 11 in the low frequency band and the high frequency band. In some embodiments, the positional relationship among the first parasitic unit 3, the second parasitic unit 4, and the antenna 11 is not limited to the positional relationship shown in FIG. 2A. The first parasitic unit 3 can be arranged at various angles with respect to the antenna 11. The second parasitic element 4 can also be arranged at various angles with respect to the antenna 11. The angles and positions can be determined according to various application scenarios.

In some embodiments, the first parasitic unit 3 and the second parasitic unit 4 may include good conductors, such as metal bars, metal strips, and/or the like.

In addition, the shapes of the first and second parasitic units 3 and 4 are not restricted in the present disclosure. In some embodiments, the first and second parasitic units 3 and 4 may have a long-bar shape. The length of the long-bar shape may be determined according to, for example, the above-described approaches, and the width of the long-bar shape may be chosen according to various application scenarios. Different widths of the first parasitic unit 3 may result in different strengths of adjustment on the radiation direction of the antenna 11 in the low frequency band. Different widths of the second parasitic unit 4 may result in different strengths of adjustment on the radiation direction of the antenna 11 in the high frequency band. Thus, the widths of the first parasitic unit 3 and the second parasitic unit 4 can be chosen according to various application scenarios.

Figure 2B:
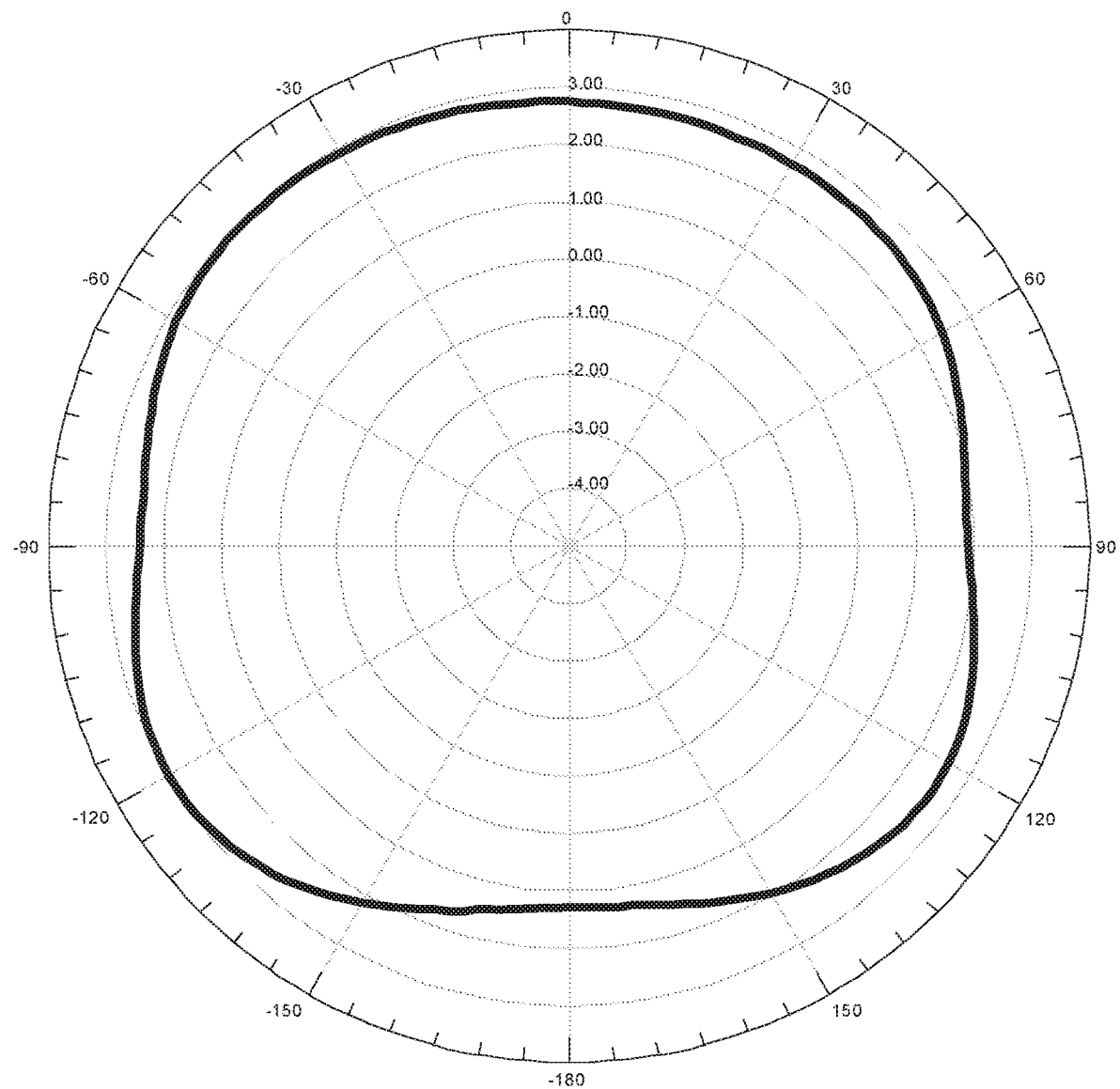
FIG. 2B illustrates a radiation direction pattern of the antenna shown in FIG. 2A in the low frequency band.

FIG. 2B shows a radiation direction pattern of the antenna 11 in the low frequency band as the antenna assembly 10 includes both the first parasitic unit 3 and the second parasitic unit 4. As compared to FIG. 1E, both the radiation direction of the antenna 11 in the low frequency band and a gain of the antenna 11 in approximately 0-degree direction are improved.

Figure 2C:
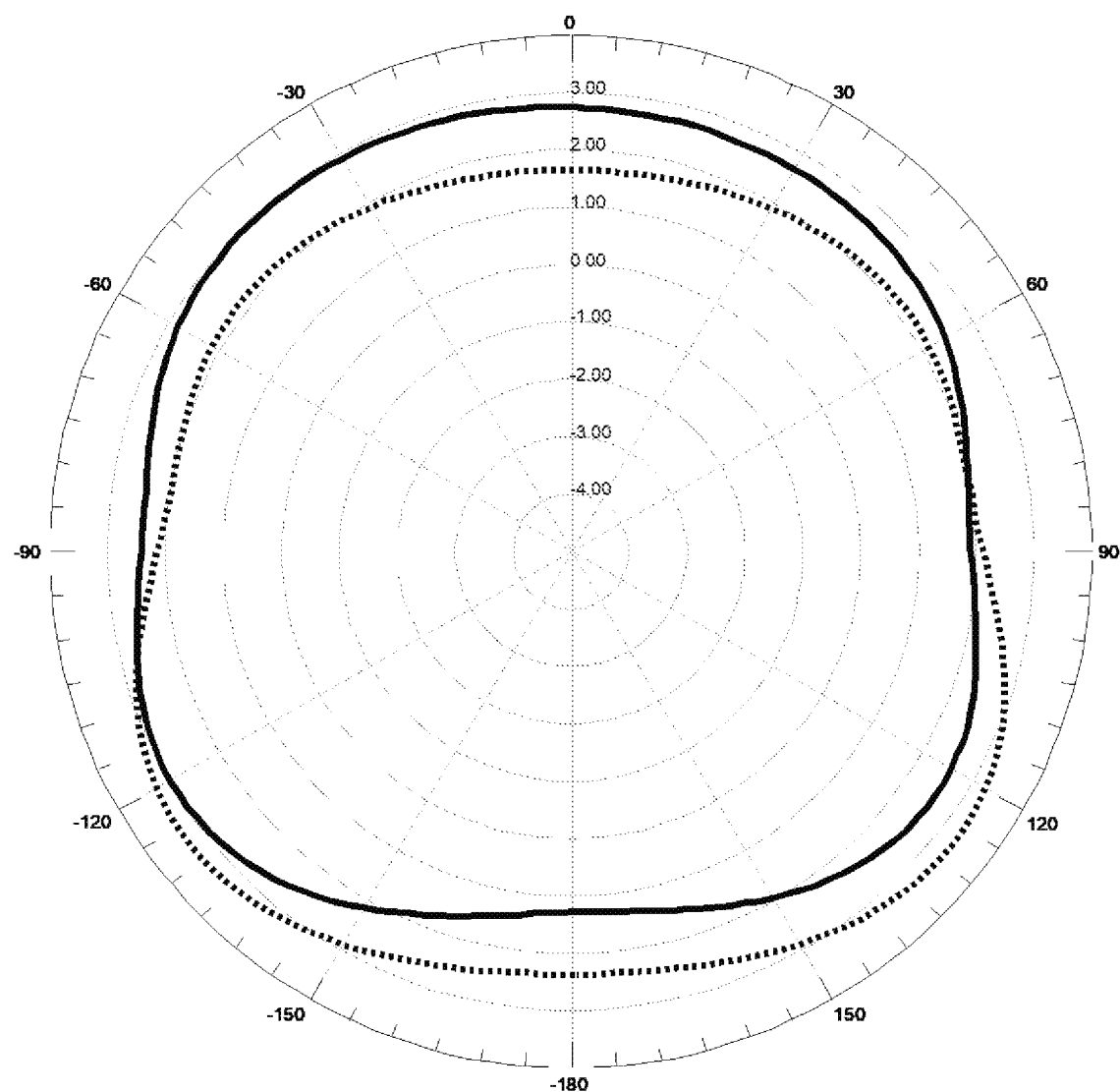
FIG. 2C illustrates a comparison between the radiation direction pattern of the antenna shown in FIG. 2A and the radiation direction pattern of the antenna shown in FIG. 1A in the low frequency band.

FIG. 2C shows a comparison between the radiation direction pattern of the antenna 11 and the radiation direction pattern of the antenna 1 in the low frequency band. The solid line in FIG. 2C represents the radiation direction pattern of the antenna 11 in the low frequency band when the antenna assembly 10 includes both the first parasitic unit 3 and the second parasitic unit 4. The dashed line in FIG. 2C represents the radiation direction pattern of the antenna 1 without the first parasitic unit 3 and the second parasitic unit 4 in the low frequency band. As compared to the radiation direction pattern of the antenna 1 as the radiation direction of the antenna 11 in the low frequency band is disturbed, the antenna 11 with the first parasitic unit 3 and the second parasitic unit 4 included in the antenna assembly 10 has both an improved radiation direction in the low frequency band and an improved gain in approximately 0-degree direction. That is, the radiation direction pattern of the antenna 11 is deviated to a side of the approximately 0-degree direction, as opposed to deviating to the side of the approximately 180 degrees (−180 degrees). Further, the improvements are obvious.

Figure 2D:
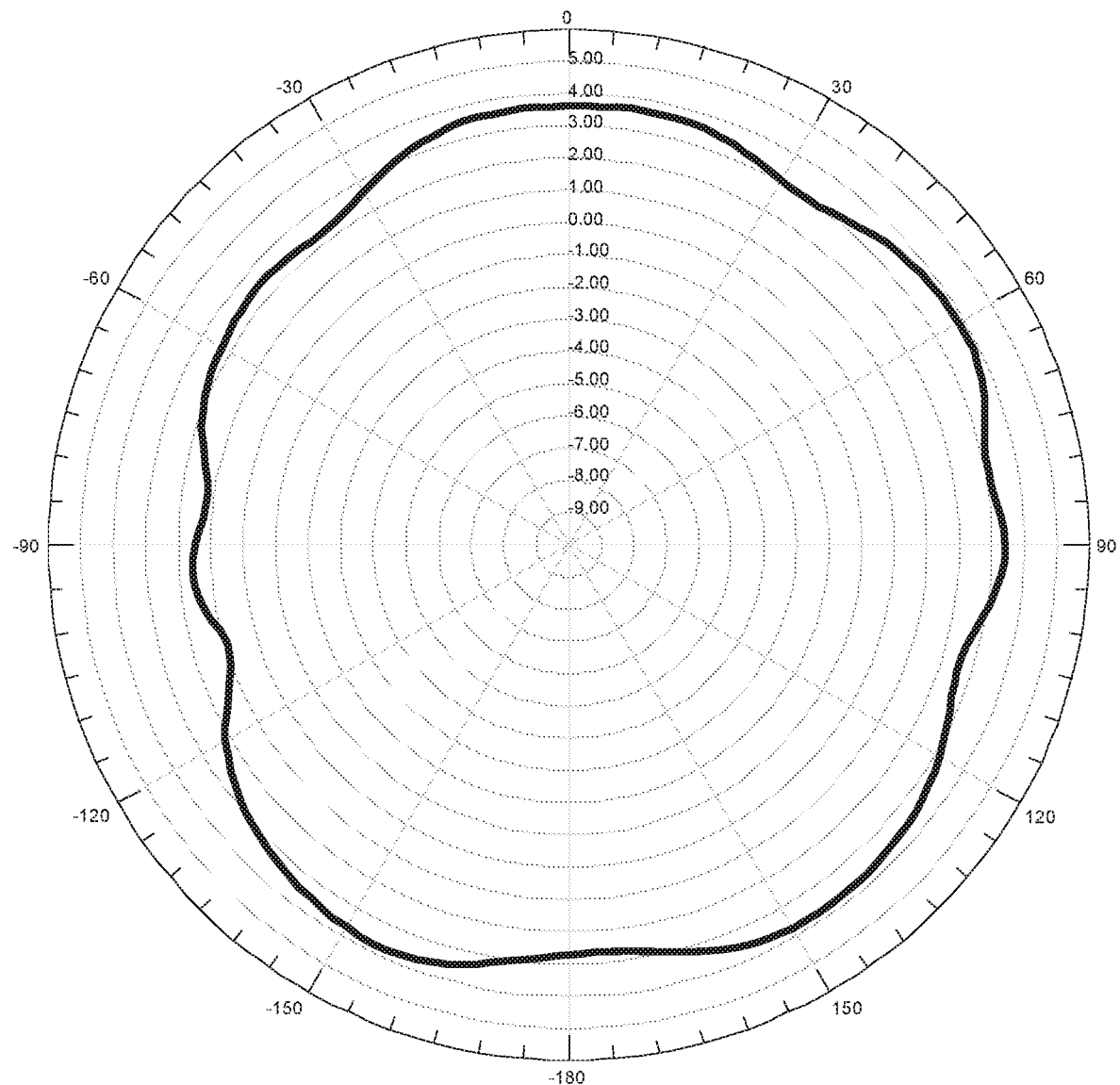
FIG. 2D illustrates a radiation direction pattern of the antenna shown in FIG. 2A in the high frequency band.

FIG. 2D shows a radiation pattern of the antenna 11 in the high frequency band when the antenna assembly 10 includes both the first parasitic unit 3 and the second parasitic unit 4. As compared to FIG. 1H, the radiation direction of the antenna 11 in the high frequency band and the gain of the antenna 11 in the approximately 0-degree direction are improved.

Figure 2E:
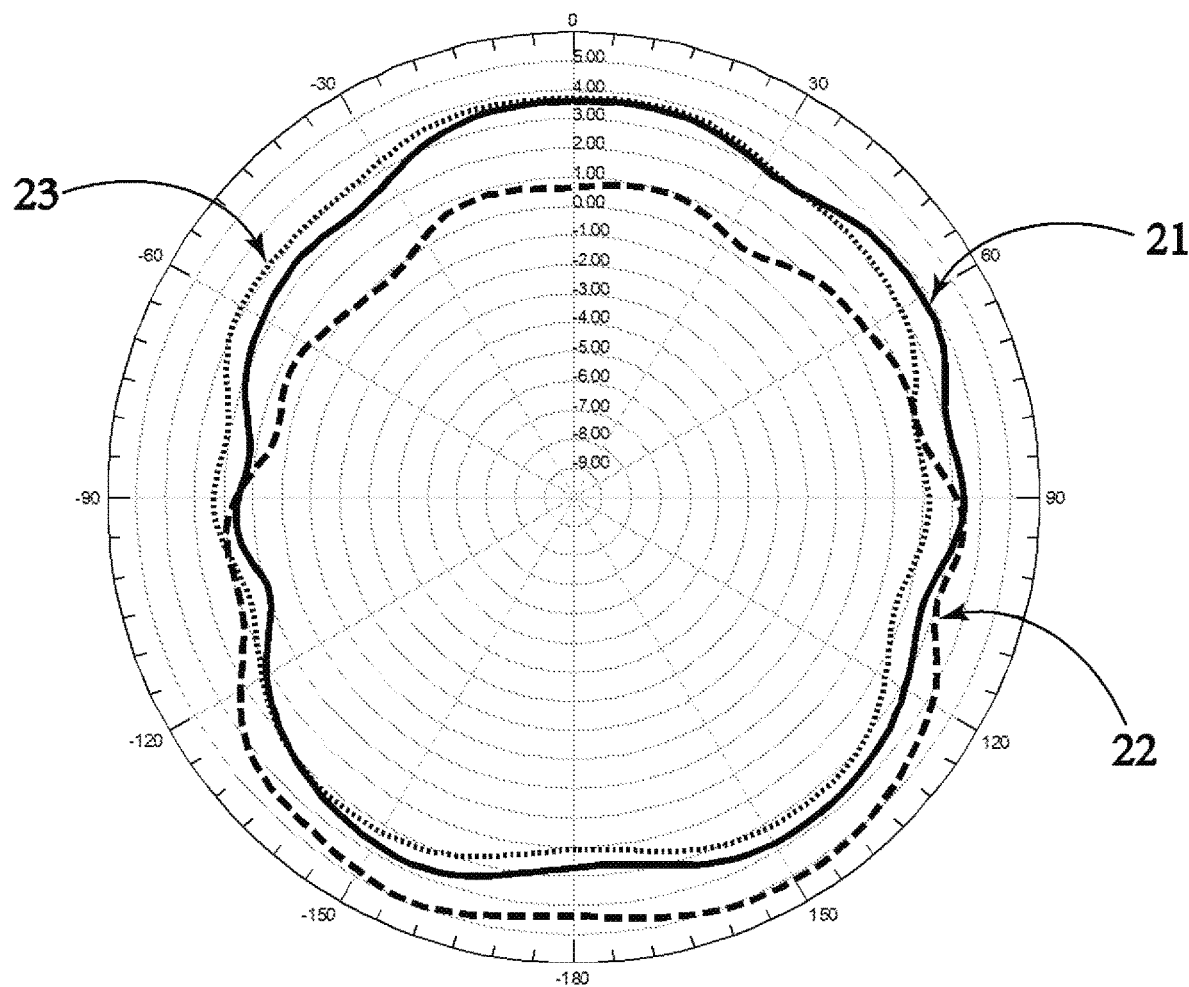
FIG. 2E illustrates a comparison between the radiation direction pattern of the antenna shown in FIG. 2A, the radiation direction pattern of the antenna shown in FIG. 1G, and the radiation direction pattern of the antenna shown in FIG. 1A in the high frequency band.

FIG. 2E shows a comparison among the radiation direction pattern of the antenna 11, the radiation direction pattern of the antenna 1 shown in FIG. 1G, and the radiation direction pattern of the antenna 1 shown in FIG. 1A in the high frequency band. Solid line 21 in FIG. 2E represents the radiation direction pattern of the antenna 11 in the high frequency band when the antenna assembly 10 includes both the first parasitic unit 3 and the second parasitic unit 4. Dashed line 22 in FIG. 2E represents the radiation direction pattern of the antenna 1 shown in FIG. 1G in the high frequency band, i.e., the scenario with the parasitic unit 3 but not the parasitic unit 4. Dotted line 23 in FIG. 2E represents the radiation direction pattern of the antenna 1 shown in FIG. 1A in the high frequency band, i.e., the scenario without either the parasitic unit 3 or the parasitic unit 4. It is seen from FIG. 2E that, with both the first parasitic unit 3 and the second parasitic unit 4, the gain of the antenna 11 in the approximately 0-degree direction is improved as compared to the scenario with only the parasitic unit 3 but not the parasitic unit 4, and the improvement is obvious.

In some embodiments, a first parasitic unit and a second parasitic unit may be included in the antenna. The first parasitic unit is used to suppress disturbance of the metal structure on a radiation direction of the antenna in a low frequency band. The second parasitic unit is used to suppress disturbance of the metal structure on a radiation direction of the antenna in a high frequency band. Accordingly, disturbance of the metal structure on a radiation direction of the antenna can be suppressed, performance of the antenna can be improved, and signal transceiving capability of a UAV including the antenna can be optimized.

The present disclosure provides an antenna assembly. The antenna assembly can be used in a device such as a UAV, a robot, a ground station, a radio station, a base station, and/or the like. In additional to the above-described examples, the antenna 11 not only can operate in two different frequency bands, but also can operate in a plurality of frequency bands in the present disclosure, frequency ranges of the plurality of frequency bands are not restricted.

In some embodiments, the antenna 11 operates in two frequency bands, and the two frequency bands include a first frequency band and a second frequency band. The first frequency band includes a low frequency band, and the second frequency band includes a high frequency band. In some embodiments, the first frequency band is from approximately 2 GHz to approximately 3 GHz, and the second frequency band is from approximately 5.4 GHz to approximately 6.2 GHz.

In addition, the above-described first preset length may be greater than approximately ¼ of a wavelength corresponding to the low frequency band and less than approximately ½ of the wavelength corresponding to the low frequency band.

In some other embodiments, the second preset length may be greater than approximately ¼ of a wavelength corresponding to the high frequency band and less than approximately ½ of the wavelength corresponding to the high frequency hand.

For compact and simple structure of the antenna assembly 10, the first parasitic unit 3 may be arranged at a position approximately 1/10 of a wavelength corresponding to an operation frequency of the antenna element 11.

In some embodiments, the position of the second parasitic unit 4 relative to the antenna 11 and the size of the second parasitic unit 4 may be determined based on the antenna 11, the first parasitic unit 3, the disturbance source such as the metal structure 2. As described above, the metal structure 2 may disturb a radiation direction of the antenna 11.

In addition, the antenna 11 and the first parasitic unit 3 may be coupled to each other through a fixing structure such as a plastic bracket, to fix the first parasitic unit 3 in a certain direction, angle, and/or position with respect to the antenna 11. The antenna 11 and the second parasitic unit 4 may be coupled to each other through a fixing structure such as a plastic bracket, to fix the second parasitic unit 4 in a certain direction, angle, and/or position with respect to the antenna 11.

In some embodiments, the fixing structure, such as the plastic bracket, for coupling the antenna 11 to the first parasitic unit 3, and the fixing structure, such as the plastic bracket, for coupling the antenna 11 to the second parasitic unit 4, are a same fixing structure, such as a same plastic bracket.

In some embodiments, the fixing structure, such as the plastic bracket, for coupling the antenna 11 to the first parasitic unit 3, and the fixing structure, such as the plastic bracket, for coupling the antenna 11 to the second parasitic unit 4, are two separate fixing structures, such as two plastic brackets.

In some embodiments, the antenna 11, the first parasitic unit 3, and the second parasitic unit 4 may be arranged in a stand of a UAV. In some embodiments, the first parasitic unit 3 and the second parasitic unit 4 may be arranged at an inner wall of the stand.

In some embodiments, lengths and widths of the first and second parasitic units may be configured flexibly according to various application scenarios. Angle and relative position between the first parasitic unit and the antenna may be flexibly adjusted. By flexibly configuring the first and second parasitic units, not only disturbance of the metal structure to the antenna can be reduced, but also strength of the first and second parasitic units suppressing the disturbance can be adjusted.

Figure 3:
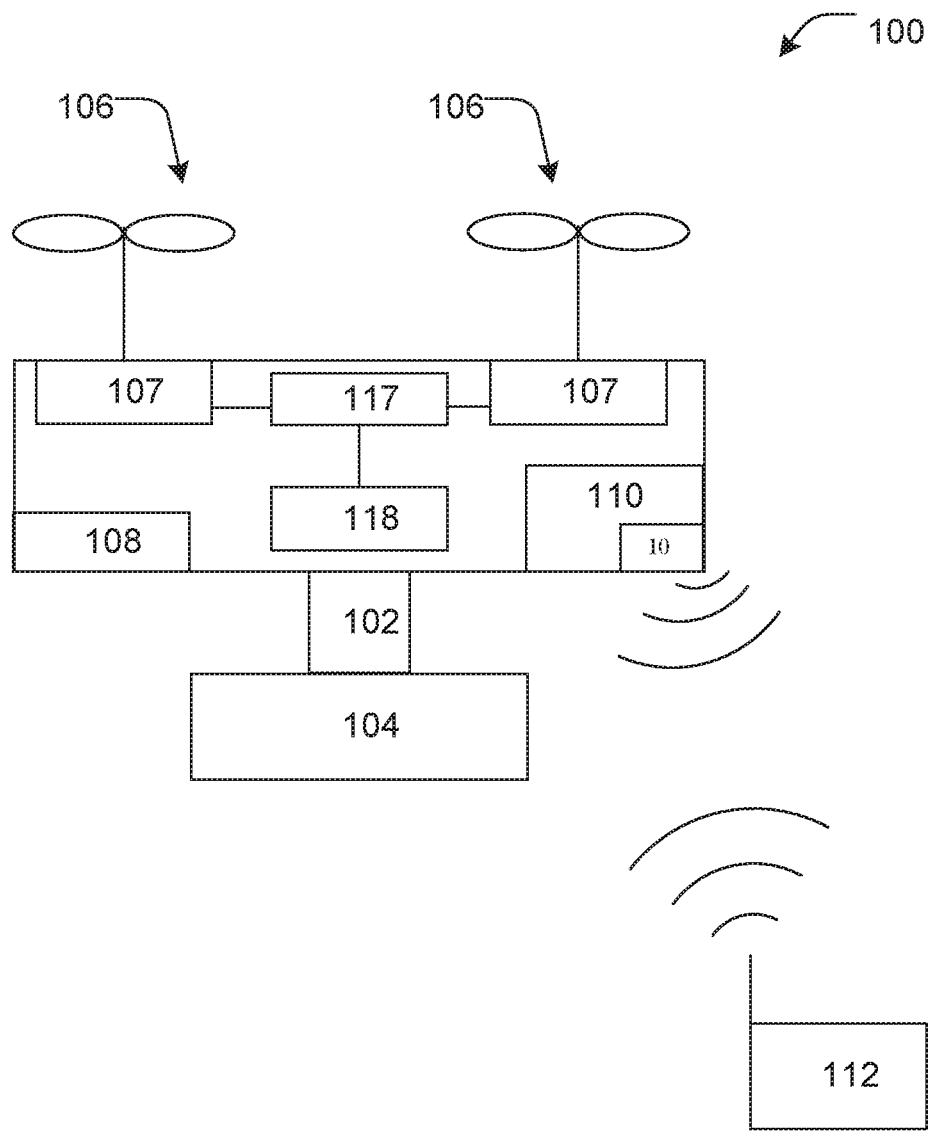
FIG. 3 illustrates a schematic view of an exemplary unmanned aerial vehicle consistent with various disclosed embodiments of the present disclosure.

The present disclosure provides a UAV. FIG. 3 is a schematic view of an exemplary UAV 100 consistent with various disclosed embodiments of the present disclosure. As shown in FIG. 3, the UAV 100 includes a fuselage, a power system, an antenna assembly 10, and a flight controller 118. The power system is arranged at the fuselage for providing flight power. The antenna assembly 10 is used for wireless communications.

The power system includes at least one of a motor 107, a propeller 106, or an electronic speed controller (ESC) 117. The power system is arranged at the fuselage to provide flight power. The flight controller 118 is communicatively coupled to the power system for controlling flight of the UAV. The flight controller 118 includes an inertial measurement unit and a gyroscope. The inertial measurement unit and the gyroscope may be used to detect acceleration, pitch angle, roll angle, yaw angle, etc. of the UAV.

In addition, as shown in FIG. 3, the UAV 100 further includes a sensing system 108, a communication system 110, a supporting device 102, and a photographing device 104. In some embodiments, the supporting device 102 may include, for example, a gimbal. In some embodiments, the communication system 110 may include, for example, the above-described antenna assembly 10. The antenna assembly 10 is used for wireless communication with a ground station 112.

In some embodiments, the antenna assembly 10 may be arranged in the stand of the UAV 100.

The operation and implementation manners of the antenna assembly 10 of the UAV 100 of these embodiments are similar to the above-described examples, descriptions of which are not repeated here.

In some embodiments, a first parasitic unit and a second parasitic unit may be arranged in the antenna. The first parasitic unit is used for suppressing the disturbance of the metal structure on a radiation direction of the antenna in a low frequency band. The second parasitic unit is used for suppressing the disturbance of the metal structure on a radiation direction of the antenna in a high frequency band. Thus, the disturbance of the metal structure on the radiation direction of the antenna can be suppressed, the performance of the antenna can be improved, and signal transceiving capabilities of the UAV equipped with the antenna can be optimized. In addition, lengths and widths of the first and second parasitic units may be configured flexibly according to various application scenarios. Angle and relative position between the first parasitic unit and the antenna may be flexibly adjusted. By flexibly configuring the first and second parasitic units, not only disturbance of the metal structure to the antenna can be reduced, but also strength of the first and second parasitic units suppressing the disturbance can be adjusted.

The disclosed systems, apparatuses, and methods may be implemented in other manners not described here. The devices described above are merely illustrative. For example, the division of units may only be a logical function division, and there may be other ways of dividing the units to implement some or all of the above-described functions. For example, multiple units or components may be combined or may be integrated into another system, or some features may be ignored, or not executed. For simplification purposes, detailed descriptions of the operations of exemplary systems, devices, and units may be omitted and references can be made to the descriptions of the exemplary methods.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by following claims.

What is claimed is:

1. An unmanned aerial vehicle (UAV) comprising:
a fuselage including a stand portion and a wing portion;
a power system arranged at the fuselage; and
an antenna assembly arranged at the stand portion of the fuselage and including:
an antenna operating in a first frequency band and a second frequency band different from each other;
a first parasitic unit configured to change a radiation direction of the antenna in the first frequency band, the antenna being arranged between the first parasitic unit and the fuselage; and
a second parasitic unit configured to change a radiation direction of the antenna in the second frequency band;
wherein the first parasitic unit and the second parasitic unit are arranged at an inner wall of the stand portion.

2. The UAV according to claim 1, wherein:
the first parasitic unit is within a preset distance from the antenna; and
a length of the first parasitic unit is a preset length.

3. The UAV according to claim 2, wherein:
the preset distance is a first preset distance;
the preset length is a first preset length;
the second parasitic unit is within a second preset distance from the antenna; and
a length of the second parasitic unit is a second preset length.

4. The UAV according to claim 1, wherein the first parasitic unit and the second parasitic unit each include a metal strip or a metal bar.

5. The UAV according to claim 1, wherein the first parasitic unit and the second parasitic unit each have a long-bar shape.

6. The UAV according to claim 1, wherein the antenna operates in a plurality of frequency bands.

7. The UAV according to claim 1, wherein:
the first frequency band includes a low frequency band, and
the second frequency band includes a high frequency band.

8. The UAV according to claim 7, wherein:
the first frequency band ranges from approximately 2 GHz to approximately 3 GHz, and
the second frequency band ranges from approximately 5.4 GHz to approximately 6.2 GHz.

9. The UAV according to claim 7, wherein a length of the first parasitic unit is greater than approximately $1/4$ of a wavelength corresponding to the low frequency band and less than approximately $1/2$ of the wavelength corresponding to the low frequency band.

10. The UAV according to claim 7, wherein a length of the second parasitic unit is greater than approximately $1/4$ of a wavelength of the high frequency band and less than approximately $1/2$ of the wavelength corresponding to the high frequency band.

11. The UAV according to claim 7, wherein a distance between the first parasitic unit and the antenna is within approximately $1/10$ of a wavelength corresponding to an operating frequency of the antenna.

12. The UAV according to claim 1, wherein a position of the second parasitic unit relative to the antenna and a size of the second parasitic unit are determined by the antenna, the first parasitic unit, and a disturbance source that generates influence on a radiation of the antenna.

13. The UAV according to claim 1, wherein the antenna assembly further includes a fixing structure mounting the antenna, the first parasitic unit, and the second parasitic unit.

14. The UAV according to claim 1, wherein: the antenna assembly further includes a fixing structure configured to fix at least one of the first parasitic unit or the second parasitic unit at an angle with respect to the antenna.

15. The UAV according to claim 1, wherein:
a length of the first parasitic unit is greater than approximately $1/4$ of a first wavelength corresponding to the first frequency band and less than approximately $1/2$ of the first wavelength; and
a length of the second parasitic unit is greater than approximately $1/4$ of a second wavelength corresponding to the second frequency band and less than approximately $1/2$ of the second wavelength, the second wavelength being different from the first wavelength.

16. An antenna assembly comprising:
an antenna arranged at a stand portion of a fuselage of an unmanned aerial vehicle and being configured to operate in a first frequency band and a second frequency band different from each other, the fuselage including the stand portion and a wing portion;
a first parasitic unit configured to change a radiation direction of the antenna in the first frequency band, the antenna being arranged between the first parasitic unit and the fuselage; and
a second parasitic unit configured to change a radiation direction of the antenna in the second frequency band;
wherein the first parasitic unit and the second parasitic unit are arranged at an inner wall of the stand portion.

17. The antenna assembly according to claim 16, wherein:
the first parasitic unit is within a preset distance from the antenna, and
a length of the first parasitic unit is a preset length.

18. The antenna according to claim 17, wherein:
the preset distance is a first preset distance,
the preset length is a first preset length,
the second parasitic unit is within a second preset distance from the antenna, and
a length of the second parasitic unit is a second preset length.

19. The antenna according to claim 16, wherein the first parasitic unit and the second parasitic unit each include a metal strip or a metal bar.

20. The antenna according to claim 16, wherein the first parasitic unit and the second parasitic unit each have a long-bar shape.

* * * * *